Patented Feb. 11, 1936

2,030,226

UNITED STATES PATENT OFFICE 2,030,226

CASEIN DISPERSION

Donald A. Rankin and Frank G. Uhler, Newburgh, N. Y., assignors to E. I. du Pont de Nemours & Company, Wilmington, Del., a corporation of Delaware No Drawing. Application February 27, 1932, Serial No. 595,653

17 Claims. (Cl. 134—79)

This invention relates to casein compositions, and more particularly, to compositions comprising a homogeneous dispersion of casein and a cellulose ether.

Heretofore solutions of casein and solutions of cellulose ethers have been known in the coating art, but a single homogeneous dispersion of casein and a cellulose ether capable of use in the coating or plastic arts has not been known.

An object of the present invention is to provide a homogeneous dispersion which will deposit films having the water repellency, flexibility and durability of cellulose ether films, together with the toughness and dryness of casein films. Other objects of the invention will be apparent from the description given hereinafter.

The above objects are accomplished according to the present invention by dispersing casein and a cellulose ether in a composite solvent mixture one component of which has, in the presence of the other component or components of the solvent mixture, a solvent action on both the casein and cellulose ether. These dispersions are preferably made by blending a dispersion of cellulose ether in a solvent or mixture of solvents with a dispersion of casein in a mixture of solvents, including a solvent for the cellulose ether. Alternatively, the cellulose ether and casein may be dispersed in a composite solvent mixture which is a combination of the individual solvent mixtures.

More specifically, the compositions of the present invention comprise a dispersion of a cellulose ether in an alcohol blended with a dispersion of casein in a mixture of an alcohol and a sulphonated fixed oil. The alcohol functions as a solvent for the cellulose ether and, in the presence of a sulphonated fixed oil, also functions as a solvent for the casein. The sulphonated fixed oil not only is a solvent for the casein but also, due to its low vapor pressure, is a softening agent for films made from these compositions.

The following examples are given to illustrate preferred embodiments of the invention, parts being given by weight:—

Example 1

| | |
|---|---|
| Casein | 10.00 |
| Ethyl cellulose | 10.00 |
| Ethyl alcohol | 50.00 |
| Sulphonated castor oil | 30.00 |

The casein was dispersed in sulphonated castor oil and part of the ethyl alcohol and then blended with the ethyl cellulose dispersed in the remainder of the ethyl alcohol.

The composition illustrated in the following examples were prepared as in Example 1:—

Example 2

| | |
|---|---|
| Casein | 10.00 |
| Ethyl cellulose | 10.00 |
| Butyl alcohol | 45.00 |
| Sulphonated olive oil | 35.00 |

Example 3

| | |
|---|---|
| Casein | 9.30 |
| Ethyl cellulose | 9.30 |
| Methyl alcohol | 46.51 |
| Sulphonated castor oil | 27.92 |
| Diethylene glycol | 6.97 |

The diethylene glycol in this example functions to give films of increased flexibility.

Example 4

| | |
|---|---|
| Casein | 5.55 |
| Benzyl cellulose | 5.55 |
| Benzyl alcohol | 27.75 |
| Ethyl alcohol | 55.60 |
| Sulphonated castor oil | 5.55 |

In this example the benzyl alcohol is the active solvent for the benzyl cellulose and the ethyl alcohol could be eliminated. However, in view of the relatively low vapor pressure of benzyl alcohol, it is advantageous to also use ethyl alcohol, which greatly improves the drying properties of the composition.

It will be understood that the invention is by no means limited to the above examples, as proportions and ingredients may be varied widely. In place of the alcohols disclosed, other alcohols may be used, such as isopropyl alcohol. Alcohol denatured with 10% by volume of acetone has also been used in the above compositions and gives excellent results.

In place of the sulphonated oils in the above examples, other sulphonated fixed oils, such as coconut, corn, cottonseed, and rapeseed oils may be used. All of these sulphonated oils function not only as a solvent for the casein, but also as a softener for films made from these compositions, inasmuch as all of these sulphonated oils have very low vapor pressures.

The flexibility of films made from compositions according to the present invention, as well as other properties of the films, may be modified by the addition of polyhydric alcohols, such as ethylene glycol, diethylene glycol, glycerol, sugars, and the like, as well as the ethers of ethylene glycol and diethylene glycol, and other polyhydroxy compounds. The additions of such agents also in some cases have a clarifying effect on dispersions of casein and cellulose ether. In order to obtain colored films, dyes or pigments may be introduced into these compositions.

While the above examples have illustrated compositions employing equal parts by weight of casein and a cellulose ether, the proportion of these two ingredients to each other may be varied at will, depending upon what properties are desired in a film resulting from the compositions. It has been found that by the use of approximately equal parts by weight of the two ingredients, dispersions result which give films having most suitable properties for general uses, combining to a remarkable degree the water repellency, flexibility and durability characteristic of cellulose ether films with the toughness and dryness characteristic of casein films. The proportion of solvent mixture to film forming ingredients, i. e., the casein and the cellulose ether, may be widely varied, it being noted that as the proportion of the solvent mixture to the film forming ingredients is increased the more rapidly a homogeneous dispersion may be effected and the clearer and tougher is the film deposited from such dispersions. The proportion of alcohol to sulphonated castor oil may be varied to any extent, as long as the proportion of each is sufficient to give a homogeneous dispersion. The proportions set forth in the above examples are preferred to obtain a highly satisfactory film with the use of a minimum amount of solvent mixture.

The invention is applicable to cellulose ethers broadly, although benzyl cellulose and ethyl cellulose are preferred. Other cellulose ethers, such as ethyl-benzyl cellulose and crotyl cellulose, may be employed.

The compositions of the present invention may be applied by brushing, casting, spraying, coating with a doctor knife or roller, or by other methods well known in the coating art, and they are of particular value in the coating of a fibrous sheet such as paper and textiles to produce leather substitutes, for use as book-binding materials, upholstery, window shades, wall coverings, and the like, although applicable for coating purposes generally. The films resulting from these dispersions are characterized by good water repellency and flexibility, together with excellent durability and unusual toughness and dryness for films including cellulose ethers, and are materially better than films employing cellulose ether or casein alone.

As many apparently widely different embodiments of this invention may be made without departing from the spirit and scope thereof, it is to be understood that the invention is not limited to the specific embodiments thereof except as defined in the appended claims.

We claim:

1. Method of preparing a homogeneous fluid dispersion of casein and a cellulose ether which comprises dispersing a cellulose ether in an alcohol and blending said dispersion with a dispersion of casein in a solvent mixture composed essentially of organic solvents and comprising a sulphonated fixed oil and an alcohol.

2. Method of preparing a homogeneous fluid dispersion of casein and ethyl cellulose which comprises dispersing the ethyl cellulose in ethyl alcohol and blending said dispersion with a dispersion of casein in a solvent mixture composed essentially of organic solvents and comprising ethyl alcohol and a sulphonated fixed oil.

3. Method of preparing a homogeneous fluid dispersion of casein and benzyl cellulose which comprises dispersing the benzyl cellulose in benzyl alcohol and blending said dispersion with a dispersion of casein in a solvent mixture composed essentially of organic solvents and comprising benzyl alcohol and a sulphonated fixed oil.

4. A composition comprising a homogeneous fluid dispersion of casein and a cellulose ether in a solvent mixture composed essentially of organic solvents and containing an alcohol and a sulphonated fixed oil.

5. A composition comprising a homogeneous fluid dispersion of casein and a cellulose ether in a solvent mixture composed essentially of organic solvents and including an alcohol and sulphonated castor oil.

6. A composition comprising a homogeneous fluid dispersion of casein and ethyl cellulose in a solvent mixture composed essentially of organic solvents and containing an aliphatic alcohol having from 1–4 carbon atoms, inclusive, and sulphonated castor oil.

7. A composition comprising a homogeneous fluid dispersion of casein and ethyl cellulose in a solvent mixture composed essentially of organic solvents and including ethyl alcohol and sulphonated castor oil.

8. A composition comprising a homogeneous fluid dispersion of approximately equal parts of casein and ethyl cellulose in a solvent mixture composed essentially of organic solvents and including ethyl alcohol and sulphonated castor oil.

9. A composition comprising a homogeneous fluid dispersion of approximately equal parts of casein and benzyl cellulose in a solvent mixture composed essentially of organic solvents and including benzyl alcohol and sulphonated castor oil.

10. A composition comprising a homogeneous fluid dispersion of approximately equal parts of casein and ethyl cellulose in a solvent mixture composed essentially of organic solvents and including ethyl alcohol and sulphonated castor oil, the amount of ethyl alcohol being in excess of the amount of sulphonated castor oil.

11. A composition comprising a homogeneous fluid dispersion of approximately equal parts of casein and ethyl cellulose in a mixture composed essentially of organic solvents and containing about 50 parts of ethyl alcohol and 30 parts of sulphonated castor oil.

12. A composition comprising a homogeneous fluid dispersion of casein and benzyl cellulose in a solvent mixture composed essentially of organic solvents and containing benzyl alcohol and a sulphonated fixed oil.

13. A composition comprising a homogeneous fluid dispersion of casein and benzyl cellulose in a solvent mixture composed essentially of organic solvents and including benzyl alcohol and sulphonated castor oil.

14. A composition comprising a homogeneous fluid dispersion of casein and benzyl cellulose in a solvent mixture including benzyl alcohol, ethyl alcohol and a sulphonated fixed oil.

15. A composition comprising a homogeneous fluid dispersion of approximately equal parts of casein and benzyl cellulose in a solvent mixture composed essentially of organic solvents and including benzyl alcohol, ethyl alcohol and a sulphonated fixed oil.

16. As an article of manufacture, a fibrous base sheet having superposed thereon a homogeneous film comprising casein, a cellulose ether and a sulphonated oil.

17. As an article of manufacture, a fibrous base sheet having superposed thereon a homogeneous film comprising casein, a cellulose ether and sulphonated castor oil.

DONALD A. RANKIN.
FRANK G. UHLER.